(No Model.)

J. W. BETZ.
SAFETY GUARD FOR CARS.

No. 522,100. Patented June 26, 1894.

WITNESSES:
John A. Bergstrom
E. Sedgwick

INVENTOR
J. W. Betz
BY
Munn & Co.
ATTORNEYS.

UNITED STATES PATENT OFFICE.

JOSEPH W. BETZ, OF BROOKLYN, NEW YORK.

SAFETY-GUARD FOR CARS.

SPECIFICATION forming part of Letters Patent No. 522,100, dated June 26, 1894.

Application filed December 8, 1893. Serial No. 493,075. (No model.)

*To all whom it may concern:*

Be it known that I, JOSEPH W. BETZ, of Brooklyn, in the county of Kings and State of New York, have invented a new and useful Improvement in Safety-Guards for Cars, of which the following is a full, clear, and exact description.

My invention relates to an improvement in safety guards for cars, and has for its object to provide a novel construction of parts in a device of the character indicated, which will be simple, practical and effective in service, and that may be quickly released from a normally elevated position at the end of a car, so as to fall and incline forwardly and downwardly when needed for protection of life.

To these ends, my invention consists in the peculiar construction and combination of parts, as is hereinafter described and claimed.

Reference is to be had to the accompanying drawings, forming a part of this specification, in which similar figures of reference indicate corresponding parts in both of the views.

Figure 1:
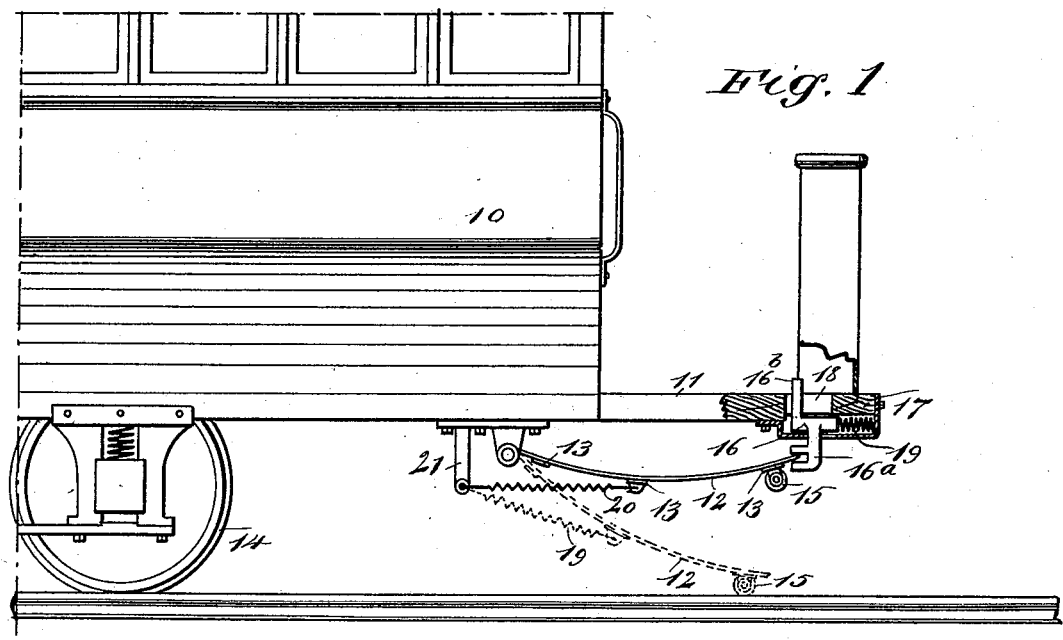
Figure 2:
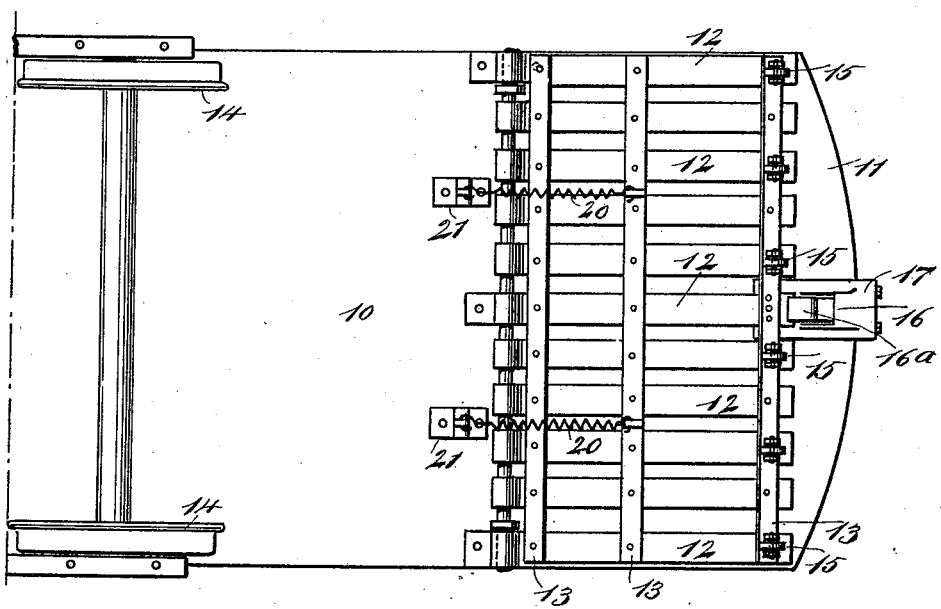

Figure 1 is a side view in part, of a car and one platform thereon broken away at the side, with the improvement represented in place on the car and platform, elevated by full lines and in lowered adjustment by dotted lines; and Fig. 2 is a reverse plan view of parts shown in Fig. 1.

In the drawings, 10 represents a street railway car, and 11 one platform projected at an end of the car body as usual, the improvement being specially adapted for service on cars of the type mentioned.

The improvement consists of a rectangular fender frame, that is hinged at its rear edge below the platform 11 so as to project forwardly, its front edge being normally engaged with a spring catch that is adapted for release by foot pressure applied by a person on the platform. It is to be understood that the safety guard appliance is provided for each end of the car, and as these guards are of duplicate construction, one only is shown and will be specifically described.

The fender may consist of a plate-like apron, but preferably is formed of slats 12, that are evenly spaced apart by cross bars 13, upon which they are firmly secured so as to provide a rectangular structure which is light and strong, having dimensions that will adapt it for effective service, its width being about equal to that of the platform 11, so that when in place it will project outside of the car wheels 14. The fender frame is curved to slightly depress it on the upper side, and is hinged at the rear edge upon the bottom of the car or platform as may be preferred, its front edge projecting nearly to the front of the platform 11, and below near said front edge of the frame, a series of spaced rollers 15 is secured so as to be free to revolve. Forwardly, on and near the transverse center of the platform 11, a latch block 16 is supported to slide toward or from the fender frame by the case 17, that is secured upon the lower side of the platform. The latch block 16 is composed of an oblong body which is loosely fitted in the case 17 so as to slide endwise, and from it depends a latch limb $16^a$, that is preferably formed as shown in Fig. 1, having two parallel jaws that are horizontal and sufficiently separated to allow the front edge of the fender frame or one slat 12, of the same, to be introduced between said jaws. An upright arm $16^b$ is formed on or secured to the latch block body 16, and projects through the case into a longitudinal slot 18 formed in the platform to admit it, the arm being elongated sufficiently to project it above the latter so as to afford an abutment for foot pressure.

In the front portion of the case 17, a spiral spring 19, is located, which is slightly compressed when introduced, so that the latch limb $16^a$ will be pressed toward the rear end of the case. A strong retractile spring 20 is secured by one end to a post 21, or other depending projection from the car frame at the rear of the fender, or two similar springs may be employed as shown in Fig. 2, the forward ends of said springs being attached to the fender frame so as to depress it quickly, and retain the rollers 15 in contact with the roadbed of the car track.

When not needed for service the fender frame is elevated so as to permit its front transverse edge to have a latched engagement with the latch limb $16^a$, as shown by full lines in Fig. 1, the springs 20, being stretched taut when the fender is so adjusted.

If there should be instant need for the employment of the safety guard or fender, to prevent a person on the track from being run over by the car wheels, it is only necessary for the operator on the platform 11 to press the arm 16$^b$ forwardly or toward the dasher of the platform, which will remove the latch limb 16$^a$ from its engagement with the fender frame, and permit the retractile springs 20, to draw said frame into the position indicated by dotted lines in Fig. 1, thereby adapting it to catch the person struck by the car and prevent the wheels of the car from injurious contact with the body thus supported above the roadbed.

Having thus fully described my invention, I claim as new and desire to secure by Letters Patent—

1. The combination, with a car and a car platform, of a fender frame hinged by its rear end upon the car below the car body, rollers on the lower side of the fender frame near its front edge, a spring-pressed latch slidable from the platform, and a retractile spring engaging the car and fender frame, substantially as described.

2. In a safety guard for cars, a latching device for the support of a hinged fender frame, comprising a case beneath the car platform, a slide block therein, a depending latch limb on said slide block, adapted to hook onto the front of the fender frame and slidable in a slot in the case, an upright arm on the slide block, reciprocable in the case and in a slot in the platform, and a spring in the case pressing upon the slide block, substantially as described.

JOSEPH W. BETZ.

Witnesses:
GEORGE J. BENDER,
HENRY LEONHAUSER.